July 28, 1936.   W. O. TWOMBLY   2,049,387
ELECTRIC HEATER
Filed Jan. 7, 1933   2 Sheets-Sheet 1
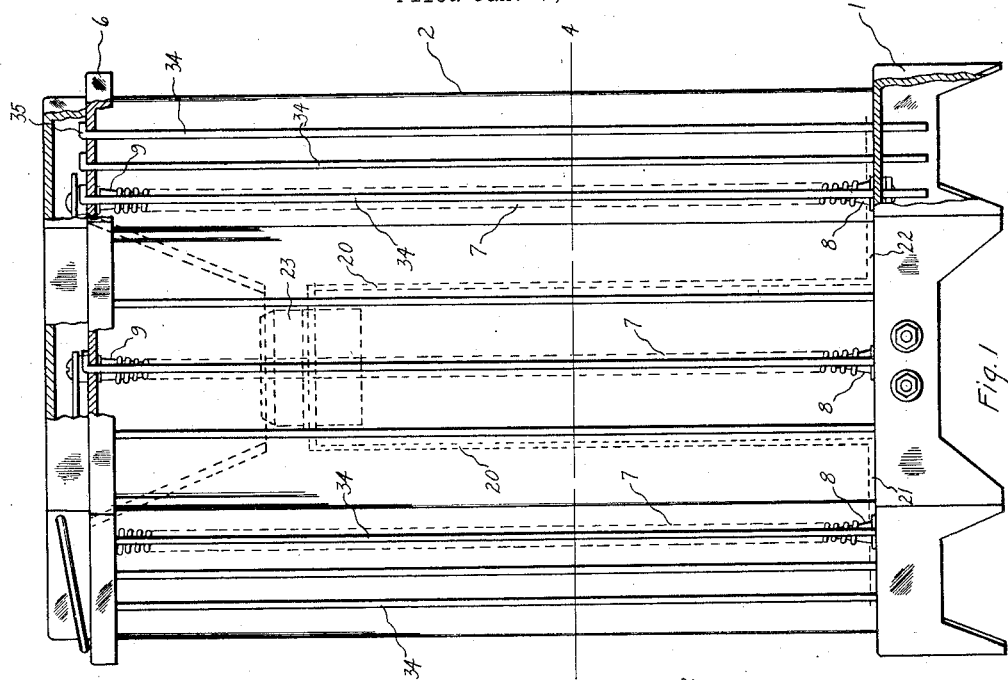
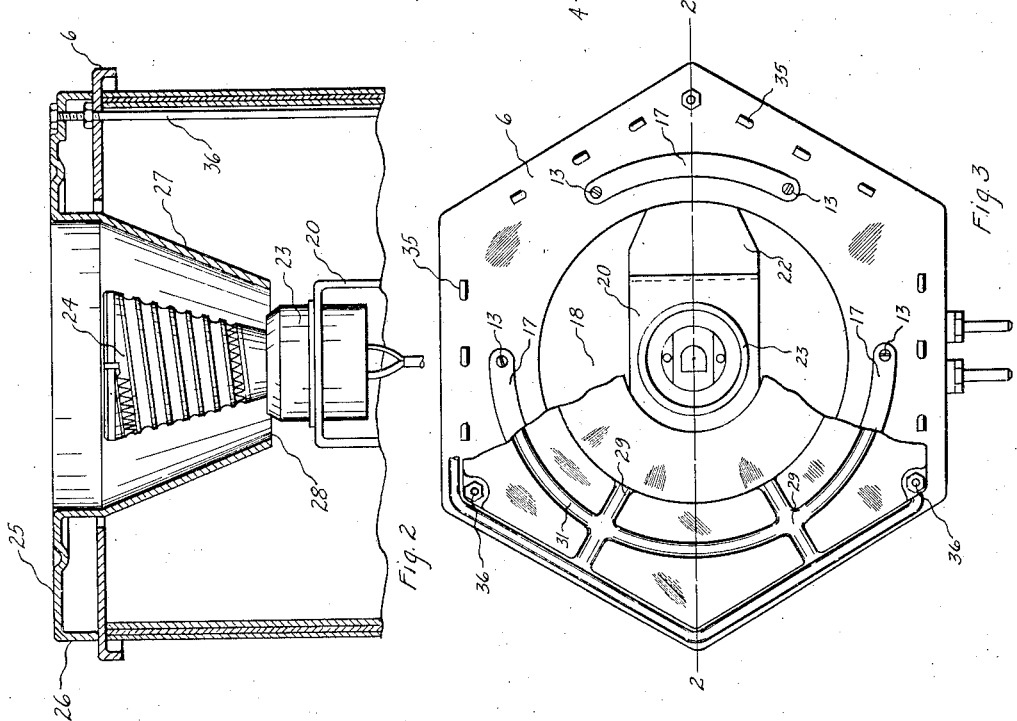
Inventor
Willard O. Twombly
by Lourren A. Beaman
Attorney July 28, 1936.  W. O. TWOMBLY  2,049,387
ELECTRIC HEATER
Filed Jan. 7, 1933  2 Sheets-Sheet 2
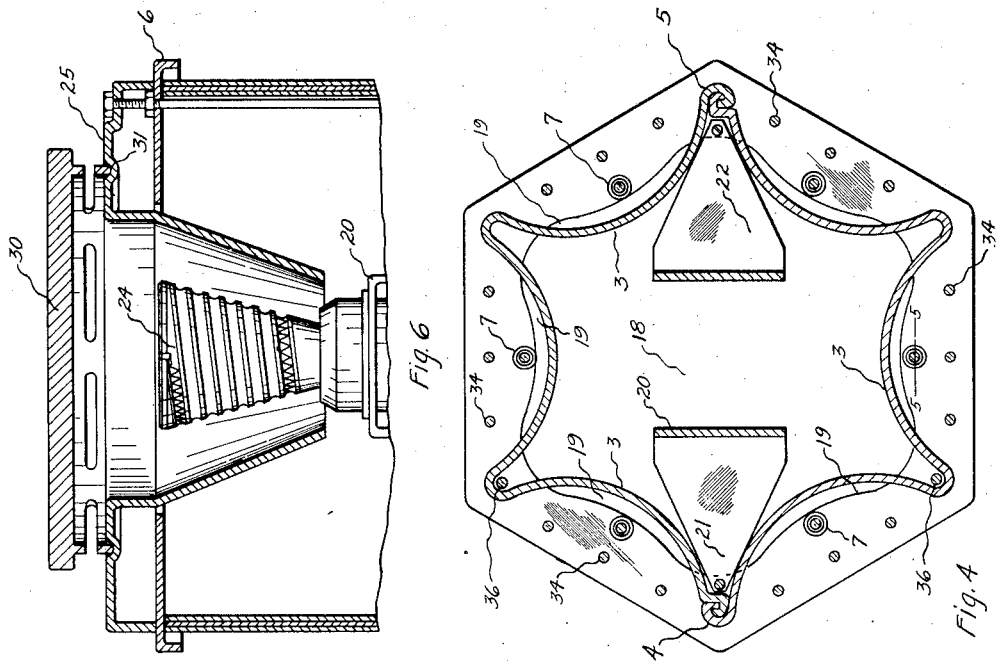
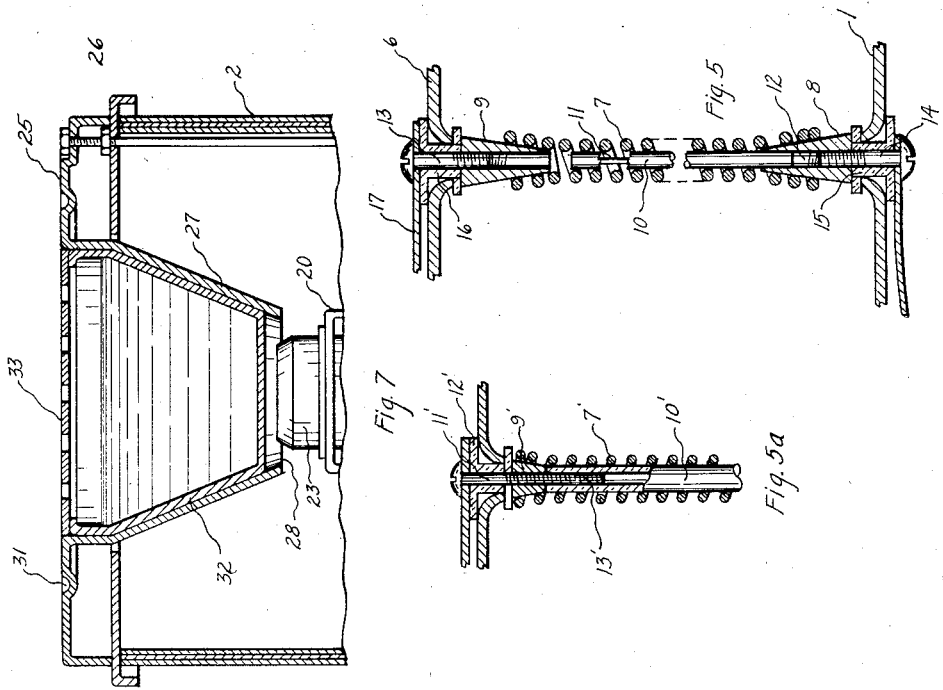
Inventor
Willard O. Twombly
by *Loumund B Beaman*
Attorney Patented July 28, 1936

2,049,387

UNITED STATES PATENT OFFICE 2,049,387

ELECTRIC HEATER

Willard O. Twombly, Jackson, Mich., assignor, by mesne assignments, to Jeffrey N. Collins, Jackson, Mich.

Application January 7, 1933, Serial No. 650,715

18 Claims. (Cl. 219—34)

The present invention relates to an improvement in portable electric heaters.

At the present, so called portable electric beam heaters have enjoyed extensive household use for removing the chill from an otherwise unheated room or for increasing the temperature in a particular room such as the nursery, bath room or the like. Heaters of this type focus all the heat emitted upon a relatively limited area and do not set up a rapid circulation of heated air as is necessary to bring a room quickly to a desired temperature.

Thus it becomes the primary object of this invention to provide a portable electric heater which will emit heat outwardly in every direction.

Another object of this invention is to provide a heater as characterized in the preceding paragraph having a centrally located reflector and heating element for directing heat upward.

A further object is to provide a novel combination electric heating radiator and stove.

These and other objects and advantages will be set forth as the description progresses and in the appended claims.

In the accompanying drawings, wherein one form which my invention may take is disclosed for the purpose of illustration, Fig. 1 is a front elevation of my heater with certain parts shown in broken section.

Fig. 2 is a partial cross sectional view taken on line 2—2 of Fig. 3.

Fig. 3 is a plan view of Fig. 1 with a portion of the top plate broken away.

Fig. 4 is a cross sectional view taken on line 4—4 of Fig. 1.

Fig. 5 is a detail cross sectional view of the heating coil construction.

Fig. 5a is a view similar to Fig. 5 of a modified construction.

Fig. 6 shows a warming plate located over the central heating element.

Fig. 7 is a cross sectional view similar to Fig. 2 showing the heating element removed and a humidifier supported in the reflector.

Generally considered the present invention resides in portable electric heaters having a standard and a top portion spaced by a continuous vertical shell. This shell is constituted from arcuate reflector sections with vertically extending heating elements associated with each section. Such construction results in the emitting of heat outwardly in all directions with equal intensity. Preferably, air vents are provided in the standard for admitting an upward draft of air at the lower portion of each reflector section. In the preferred form of my invention, an additional heating element is provided centrally of the vertical reflection sections for directing heat upwardly. This additional heating element materially increases the rate of heating by increasing the draft of air through the heater and at the same time enables the heater to function as both an electric heater and as an electric cook stove.

Having specific reference to drawings, my improved electric heater consists of a base 1 supporting a plurality of vertical reflector sections. As illustrated, a continuous vertical shell 2 is constituted from a plurality of arcuate reflector sections 3. Obviously, the reflectors 3 could be separately constructed and supported. However, in my preferred form the shell 2 is fabricated from two sections of material having rolled seams at 4—5 to provide a continuous shell. An upper member 6 is spaced from the base 1 by the shell 2. Vertically extending heating elements 7 are associated with each reflector sections 3 and supported from terminals 8—9. The heating element 7 may be of any of the well known resistance heating elements but is preferably a spirally wound coil which may be expanded by an untwisting operation and positioned upon the terminals 8—9 which may be conical shape as shown. The terminals 8—9 are frictionally engaged by the coils 7 and effected as excellent electrical coupling. The coils 7 being of considerable length renders it desirable to reinforce and stiffen the same. This may be satisfactorily accomplished through the employment of a dielectric stiffening rod, which in the case of porcelain may be reinforced by a metal rod 11. As illustrated, the rod 7 is received within an aperture 12 in the terminal 8 to aid in supporting the rod in a vertical position. The terminals 8—9 are supported in position by bolts 13—14 threaded therein. Insulating members 15—16 insulate the bolts 13—14 and terminals 8—9 from the base 1 and member 6. Although my invention is not limited to any particular electrical circuit for coupling the various heating elements, as shown, adjacent pairs of coils 7 are connected in series by conductors 17 extending between adjacent terminals 9.

In the modification shown in Fig. 5a, the coil 7' is expanded over the terminal 9'. The coil 7' is reinforced by a tubular dielectric rod 10', preferably of porcelain, which is held in alignment by a bolt 11' passed through the insulator 12' and threadedly received in the terminal 9'. The end 13' of the bolt 11' extends through the terminal 9' and into the tubular reinforced rod 10' to retain the same against lateral movement.

The base 1 is preferably provided as an open central portion 18. The open portion is shown as extending beyond the vertical projection of the reflector sections 3 to provide vents 19 adjacent thereto. This arrangement results in a rapid circulation of heated air outwardly from the heater in all directions. The opening 18, which may be of any suitable configuration, also permits an upward draft of heated air through the stack formed by the shell 2.

A support for a heating element is provided within the shell 2 by a bracket 20 having footed portions 21—22 secured to the base 1. A threaded electrical socket 23 is provided to receive a removable heater 24, preferably of the cone type. A flat top plate 25, upon which cooking utensils may be supported, is slightly spaced from the member 6 by a turned edge. This plate serves as a cover for the exposed electrical terminals 13 and conductors 17 and has a central opening from which a reflector 27 may be suspended. The reflector 27 is shown integral with the plate 25 but this is not necessary. As illustrated, excellent heating results have been obtained by having the walls of the reflector 27 vertical adjacent the plate 25 to direct the heat vertically. The lower portion of the reflector 27 is conical and is spaced from the socket 23 at the end portion to provide an annular vent 28. This construction permits cold air to flow in through the opening 18 into the shell 2 where it becomes heated by the inner walls of the reflector sections 3 and passes out through the vent 28. The reflector 27 and its associated heater greatly accelerates the circulation of air through the shell 2 as will be readily apparent.

When my improved heater is functioning as a combination radiator and cooking stove, a cooking utensil may be directly supported upon the plate 25. Radially extending recesses 29 may be provided in the plate 25 to prevent the utensil from interrupting the entire flow of air through the reflector 27. In the event it is desired to merely employ the central heater as a food warmer, a warming plate 30 may be removably supported upon the plate 25. Circular recess 31 in the plate 25 is shown retaining the plate 30 in a definite position.

As I contemplate the employment of my improved heater as a permanent source of heat for small apartments, cottages, and the like, it is essential that some means are provided for supplying the proper amount of humidity. This can be effected very conveniently by the removal of the heater 24 and the supporting of a removable vessel 32 in the reflector 21; the vessel 32 may be provided with a perforated top plate 33 flush with the plate 25. The heat within the shell 2 will result in the proper evaporation of the liquid in the vessel.

To shield the heating element 7, aligned holes are provided in the base 1 and member 6 through which rods 34 are loosely inserted. The ends of the rods are bent at one end to provide a head 35 supported upon the member 6. The rods 34 are inserted prior to the location of the plate 25 and extend through the base 1 a distance greater than the spacing between the member 6 and the plate 25 to prevent disengagement from the holes in base 1. The entire heater assembly is held together by tie rods 36.

It is to be clearly understood that I do not desire to be limited to the exact details of construction hereinbefore set forth but intend to include as part of my invention all such changes and modifications which would occur to those skilled in the art and fall within the appended claims.

Having set forth my invention, what I claim as new and desire to protect by Letters Patent is:

1. A portable electric heater comprising spaced upper and lower horizontal members, a continuous vertical shell spacing said members, said shell consisting of a succession of arcuate reflector sections, vertical heating coils supported from said members in front of said sections, air vents in said lower member adjacent said sections, a central heating coil supported within the upper portion of said shell, a cone-like reflector for said central heating coil opening through said upper member, said reflector being spaced from said coil support to provide a vent opening into said shell.

2. A portable electric heater comprising spaced upper and lower horizontal members, a continuous vertical shell spacing said members, said shell consisting of a succession of arcuate reflector sections, vertically extending heating coils supported from said members in front of said sections, a central heating coil supported within the upper portion of said shell, a cone-like reflector for said last coil opening through said upper member, and vents adjacent each of said coils to provide a vertical draft between said reflectors and said coils.

3. A portable electric heater comprising spaced upper and lower horizontal members, vertical heating coils supported from said members and uniformly spaced about the circumference of a circle subscribed upon said members, a continuous vertical shell spacing said members and located within said spaced coils, said shell comprising a succession of arcuate reflector sections opposite each of said coils for radiating the heat outwardly in all directions, a central heating coil supported within the upper portion of said shell, and a reflector opening through said upper member for directing the heat of said central coil upwardly.

4. A portable electric heater comprising spaced upper and lower horizontal members, vertical heating coils supported from said members and uniformly spaced about the circumference of a circle subscribed upon said members, a continuous vertical shell spacing said members and located within said spaced coils, said shell comprising a succession of arcuate reflector sections opposite each of said coils for radiating the heat outwardly in all directions, a central heating coil supported within the upper portion of said shell, a reflector opening through said upper member for directing the heat of said central coil upwardly, and means providing a draft through said shell and said last reflector.

5. A portable electric heater comprising spaced upper and lower members, vertical heating coils supported from said members and uniformly spaced about the circumference of a circle subscribed upon said members, a continuous vertical shell spacing said members and located within said spaced coils, said shell comprising a succession of arcuate reflector sections opposite each of said coils presenting a scalloped cross section for radiating the heat outwardly in all directions.

6. A portable combination electric radiator and stove comprising spaced upper and lower members, vertical heating coils supported from said members and uniformly spaced about the circumference of a circle subscribed upon said members, a continuous vertical shell spacing said members and located within said spaced coils, said shell comprising a succession of arcuate reflector sections opposite each of said coils for radiating the heat outwardly in all directions, a central heating coil supported within the upper portion of said shell, a flat plate for supporting cooking utensils supported upon said upper member, the central portion of said plate constituting a cone-like reflector extending downwardly through said upper member into said shell to receive said central coil and direct the heat upwardly.

7. A portable combination electric radiator and stove comprising spaced upper and lower members, vertical heating coils supported from said members and uniformly spaced about the circumference of a circle subscribed upon said members, a continuous vertical shell spacing said members and located within said spaced coils, said shell comprising a succession of arcuate reflector sections opposite each of said coils for radiating the heat outwardly in all directions, a central heating coil supported within the upper portion of said shell, a flat plate for supporting cooking utensils supported upon said upper member and located above said last coil, a reflector opening through said plate into said shell for directing the heat from said last coil upwardly, and openings in said members and said last reflector to enable a vertical draft to pass upwardly through said shell and adjacent said last coil.

8. A portable electric heater comprising a plurality of vertical heating elements spaced about the circumference of a circle, vertical arcuate reflector sections constituting a continuous shell associated with said elements for directing the heat outwardly in all directions, and a central heating element located in said shell having a reflector associated therewith for directing the heat upwardly.

9. A portable combination electric heater and stove comprising a plurality of vertically arranged heating elements, a plurality of vertical reflectors directing the heat from said elements outwardly in all directions, a plate for supporting cooking utensils supported above said elements, an additional heating element located centrally of said reflectors, and a reflector for said additional element directing heat upwardly through said plate.

10. A portable electric heater comprising a plurality of vertically arranged heating elements, a plurality of vertical reflectors constituting a circular stack having a scalloped cross section directing the heat from said elements outwardly in all directions, said reflectors constituting a central stack, and an additional heating element located in said stack for accelerating the circulation of heated air through the same.

11. A portable electric heater comprising a pair of spaced upper and lower members, a plurality of heating elements supported from said member, a plurality of reflectors associated with said elements spacing said members for directing the heat outwardly in all directions, a cover supported upon said upper member and spaced therefrom, a conical reflector supported from said plate and extending through said upper member, and a heating element received within said reflector.

12. A portable electric heater comprising a vertical reflecting shell, heating elements associated with the outside of said shell, a support for a heating element located in the upper central portion of said shell, a reflector positioned about said support for directing heat upwardly from a heating element located in said support, and a humidifier removably supported in said reflector.

13. A portable electric heater comprising spaced upper and lower members, a vertical arcuate reflector spacing said members, a heating element associated with said reflector, aligned holes in said members located outwardly relative to said element and reflector, shielding rods for said element loosely inserted in said holes, said rods being supported from said upper member, and a cover plate located upon said upper member for retaining said rods in position.

14. A portable electric heater comprising a base having supporting legs and a flat upper portion, a vertically disposed shell consisting of a plurality of vertically disposed channel shape reflectors of concavo-convex cross section supported directly upon the flat portion of said base, a top directly supported upon the upper end of said shell and having a flat upper portion for supporting culinary utensils, and a plurality of vertically disposed heating coils associated with each of said reflectors, said coils being supported from said top and base.

15. A portable electric heater comprising a base having supporting legs and a flat upper portion, a vertically disposed shell consisting of a plurality of vertically disposed channel reflectors of concavo-convex cross section supported directly upon the flat portion of said base, a top directly supported upon the upper end of said shell and having a flat upper portion for supporting culinary utensils, a plurality of vertically disposed heating coils associated with each of said reflectors and extending substantially the entire length thereof, and terminals located upon said top and base from which said coils are supported.

16. A portable electric heater comprising a base having supporting legs, a vertically disposed shell consisting of a plurality of vertically disposed channel shape reflectors of concavo-convex cross section supported directly upon said base at the lower end, a top directly supported upon the upper end of said shell and having a flat upper portion for supporting culinary utensils, and a plurality of vertically disposed resistance heating coils substantially coextensive with said reflectors and associated therewith to radiate heat outwardly in all directions.

17. A portable electric heater comprising a base having supporting legs, a vertically disposed shell consisting of a plurality of vertically disposed channel shape reflectors of concavo-convex cross section supported directly upon said base at the lower end, a top directly supported upon the upper end of said shell and having a flat upper portion for supporting culinary utensils, a plurality of vertically disposed resistance heating coils substantially coextensive with said reflectors and associated therewith to radiate heat outwardly in all directions, said coils being supported from said top and base and spaced from said reflector, and air vents in said base between said coils and reflector.

18. A portable electric heater, comprising a base having supporting legs, a top, a vertically disposed shell comprising a plurality of vertically disposed channel shape reflectors of concavo-convex cross section, said shell being directly supported upon said base at the lower end and spacing said top and base, vertically disposed heating coils associated with and substantially coextensive with said reflectors, and means for retaining said top, base and shell in an assembled state.

WILLARD O. TWOMBLY.

CERTIFICATE OF CORRECTION.

Patent No. 2,049,387. July 28, 1936.

WILLARD O. TWOMBLY.

It is hereby certified that error appears in the printed specification of the above numbered patent requiring correction as follows: Page 3, first column, line 60, claim 11, after "cover" insert the word plate; and that the said Letters Patent should be read with this correction therein that the same may conform to the record of the case in the Patent Office.

Signed and sealed this 29th day of September, A. D. 1936.

Henry Van Arsdale (Seal) Acting Commissioner of Patents.